Aug. 28, 1956  E. W. CURTIS  2,760,216
PORTABLE RAMP
Filed Jan. 13, 1953
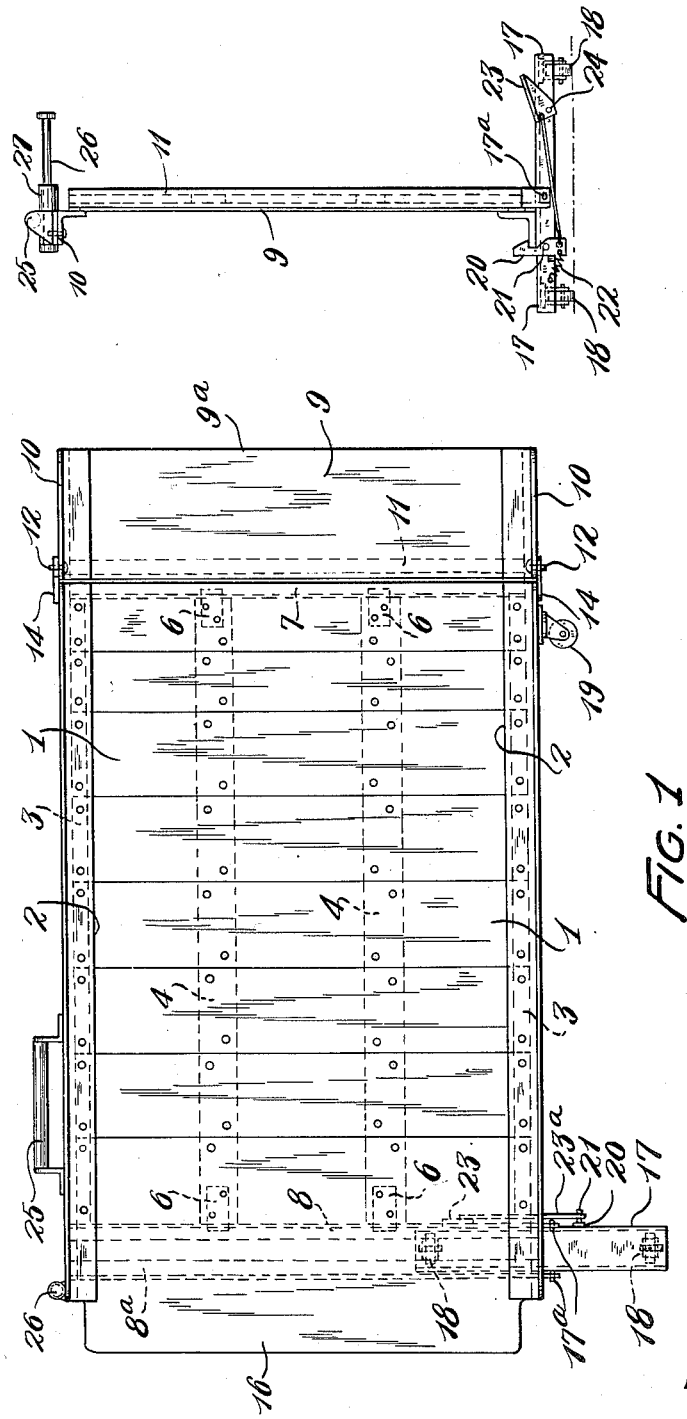
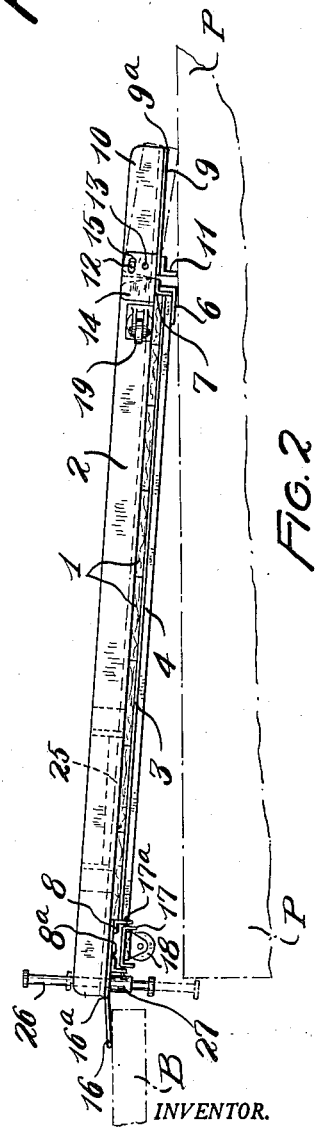
INVENTOR.
EARL W. CURTIS
BY
Milburn & Milburn
ATTORNEYS

United States Patent Office 2,760,216
Patented Aug. 28, 1956

2,760,216

PORTABLE RAMP

Earl W. Curtis, Temple, Pa., assignor to Bachman Bakeries, Inc., Reading, Pa., a corporation of Pennsylvania Application January 13, 1953, Serial No. 331,084

3 Claims. (Cl. 14—72)

The present invention is for an improved loading or unloading ramp that is provided with means whereby it is readily portable to and from the point of use and can be conveniently stored in a location and position out of the way while not in use.

As is of course well known, there is almost invariably a difference in elevation between the floor or bed of a truck, railroad car, etc. and the platform onto which or from which the load is to be transferred; and, as a matter of convenience, it is desirable to have a ramp between the two different levels in any given case.

With this in mind, I have devised a self-contained or unitary ramp that is capable of being conveniently moved to and from the point of use and stored in a location and position out of the way when not in use.

More specifically, the object of my invention is to devise such a portable ramp that is mounted upon a roller base or carriage for convenient transportation to and from its point of use and that can be manipulated so as to occupy lowered position substantially parallel to the roller base or carriage when the ramp is in use or can be adjusted to upright position upon its edge at substantially right angle to the base or carriage when it is not in use.

Another object is to devise such a portable ramp with adjustable means at one end of the same to compensate for the variable elevation of the other end of the ramp and thereby provide an efficient roadway from the bed of the truck or car to the loading platform and vice versa.

Another specific object of my present invention is to devise such a portable ramp with means to prevent accidental dislodgement of the same lengthwise thereof during actual use of the same.

Other objects will appear from the following description and claims when considered together with the accompanying drawing.

Fig. 1 is a top plan view of my present device in position of actual use in loading or unloading between a truck or car and a platform at a different elevation;

Fig. 2 is a side elevation thereof;

Fig. 3 illustrates the ramp in raised position upon its one edge and supported upon the roller base or carriage so as to facilitate its removal to another place of use or to a more convenient place for storage while not in use; this view corresponding to an end elevation. Some structural details are omitted from this view, as for instance the angle irons 2 and the side strips 3, which of course are included in the structure itself.

Referring now to the accompanying drawing in detail, the body of the ramp itself may be constructed of any suitable material and is here illustrated as consisting of the transversely disposed boards 1 that are bolted at their opposite ends between the longitudinally extending side angle irons 2 and the parallel longitudinally extending side strips 3 of metal therebeneath. The wood strips 4 extend parallel beneath and are bolted to the boards 1 and are supported at their ends by the metal brackets 6 that are in turn attached to the cross members 7 and 8, as for instance by welding. The cross members 7 and 8 are anchored at their ends by welding, for instance, to the angle members 2.

A steel plate 9 extends across one end of this ramp and has its ends affixed to the under-sides of the side angle members 10, as for instance by welding, and has welded therebeneath the cross angle member 11, the angle members 10 being each provided with a fixed pin 12 and a fulcrum stud 13. A steel plate 14 is welded to the angle bar 2 at each side of the ramp body and extends along the side of the angle member 10 in each instance; the plate 14 having a hole for extension of the stud 13 therethrough and a slot 15 for the pin 12 so as to permit adjustment of this end part of the ramp in the manner indicated. That is, with the ramp resting at the points 6 upon the platform P, the plate 9 may turn about its pivot points 13 so that the plate 9 may rest at the points 11 and 9a upon the floor of the loading platform P and thereby assume proper inclination from the main part of the ramp to the platform P and thus compensate for variable elevation of the opposite end of the ramp that is adapted to rest upon the bed B of the truck or car; such pivotal movement being permitted by engagement of the pins 12 in their slots 15, and the angle member 11 being positioned beneath the pivotal connection just referred to. As shown, this pivotal connection is beyond the points 6.

The other end of the main body of the ramp is provided with a steel plate 16 that is welded at its ends to the under-sides of the angle members 2 and has welded to the under-side thereof the cross members 8 and 8a of angle form. The plate 16 is bent downwardly, as indicated at 16a, so as to permit its free edge to rest upon the bed B of the truck or railway car.

I have provided a roller base or carriage 17 that is of steel channel construction and that has pivotal connection at the opposite points 17a with the cross angle members 8 and 8a. This carriage has a pair of fixed casters 18 at the two ends thereof and is adapted to occupy either the position indicated in Figs. 1 and 2, when the ramp is in use, or the position indicated in Fig. 3 in full lines when the ramp is idle. That is, when the ramp is in use, the carriage will occupy position beneath the ramp and substantially parallel therewith; and when the ramp is not in use, it may be made to occupy position substantially at right angle and perpendicular to the carriage so as to permit the same to be rolled away to a more convenient point for storage and so as to conserve floor space, as illustrated in Fig. 3 of the present drawing. Of course the ramp may be moved with the same convenience to another point of use; and it may be so handled by a single operator.

Affixed to one of the angle members 2 and near the one end thereof opposite the roller base or carriage there is the single swivel caster 19 in a plane midway between the rollers or casters 18 so as to co-operate therewith when rolling the ramp in upright position, as above explained.

In order to maintain the ramp itself in upright or idle position upon the carriage or roller base, I have provided the latch 20 pivotally mounted at 21 upon the channel member 17 so as to be adapted for locking engagement with one edge of one of the angle members 2, as illustrated in Fig. 3 of the present drawing. The spring 22 tends normally to force the latch 20 towards latching position. As a means for releasing the latch 20, I have provided the link connection 23a between the rear end of the latch and the foot pedal 23 which is pivoted at 24 upon the carriage channel 17 at such a point as to be conveniently accessible for manipulation by the foot of the user when it is desired to release the latch 20 and to permit the ramp to be lowered to operative position. As a means of facilitating such manipulation of the ramp about the axis of the points 17a, there is the handle 25 upon the side and near the one end of one of the angle members 2 and substantially opposite the roller base or carriage 17.

Thus, when the ramp is in position of use, it will extend in a plane above and substantially parallel to that of the roller base or carriage, as indicated in Figs. 1 and 2 of the present drawing. Then, when it is desired to move the ramp from one position of use to another or if it be desired to move the ramp to a place out of the way until again desired for use, the operator will grasp the handle 25 and turn the ramp upwardly about the pivot points 17a so as to cause the ramp to extend upright edge-wise upon the roller base or carriage 17, whereupon the latch 20 will snap into engagement with the angle member 2 so as to hold the ramp in such upright position upon the carriage, as in Fig. 3 hereof. Then this device may be rolled easily upon the rollers 18 and 19 to any desired point for further use or for storage. Whenever so desired, the operator may depress the pedal 23 with his foot so as to release the latch 20 and permit the ramp to be lowered to operative position while grasping the handle 25, the pedal and handle being so located as to be conveniently engaged or manipulated by the same operator at the same time.

The rod 26 is slidably movable through the tubular member 27 that is affixed to an angle member 2 so as to be extended downwardly in front of the platform P when the ramp is in operative position (see Fig. 2), and to prevent accidental dislodgement of the ramp from the ber B of the truck or car. That is, upon placing the ramp in position for use, the rod 26 will drop down through the tubular member 27 so as to occupy position in front of the platform P in the manner just indicated.

It will be explained that the slots 15 may be made sufficiently long and may be suitably curved if so desired to permit suitable angular positioning of the plate 9 so as to assume proper inclination for resting upon the platform P in case the platform P might be higher than the bed B, in which case the ramp might rest at the points 6 upon the edge portion of the platform P. Or, in the event that the platform P were higher than the bed B of the truck or railway car, the position of the present ramp might be reversed end for end so as to rest the plate 16 upon the edge of the platform P and to rest the other end of the ramp including the plate 9 upon the bed B.

Also, it will be explained that the steel plates 9 and 16 may have their top surfaces roughened so as to prevent slipping when walking upon the same.

It is to be understood that the present form of disclosure is merely for the purpose of illustration and that there might be various modifications thereof without departing from the spirit of my invention as herein set forth and claimed; and it is believed that the practical advantages flowing from this invention will be apparent to those who are familiar with the art to which it relates.

What I claim is:

1. A carriage, wheels at opposite ends of said carriage, a ramp pivotally mounted at a forward edge centrally on said carriage on an axis parallel to said edge for movement from an operative position parallel to said carriage to an inoperative position vertical with respect thereto, and means for releasably locking said ramp in vertical position on said carriage.

2. The same structure as recited in claim 1 hereof and with the addition of a handle upon the forward edge of said ramp corresponding to the upper edge thereof when said ramp is in vertical inoperative position, and a roller upon the rearward edge of said ramp corresponding to the lower edge thereof when it is in vertical inoperative position.

3. The same structure as recited in claim 2 herein and in which said locking means is spring-actuated for releasing the same and has foot-pedal means for initiating the release of the same, and in which said handle and foot-pedal means are located within reach of the same operator for simultaneous engagement by his hand and foot, respectively.

References Cited in the file of this patent
UNITED STATES PATENTS

| | | |
|---|---|---|
| 1,427,247 | Weston | Aug. 29, 1922 |
| 1,895,677 | Pinheiro | Jan. 31, 1933 |
| 2,284,022 | Schmeller | May 26, 1942 |
| 2,329,855 | Rydner | Sept. 21, 1943 |
| 2,449,829 | Agren | Sept. 21, 1948 |